United States Patent
Reagan

[11] Patent Number: 5,956,832
[45] Date of Patent: Sep. 28, 1999

[54] OPTICAL FIBER CONNECTOR INSERTION AND REMOVAL TOOL

[75] Inventor: Randall A. Reagan, Morris Plains, N.J.

[73] Assignee: Lucent Technologies Inc., Murray Hill, N.J.

[21] Appl. No.: 09/024,351

[22] Filed: Feb. 17, 1998

[51] Int. Cl.[6] .................................................. B25B 27/14
[52] U.S. Cl. .............................................................. 29/278
[58] Field of Search ............................. 29/764, 278, 280, 29/281.1, 283, 270; 269/6; 81/4, 3.88; 294/99.1, 99.2, 100

[56] References Cited

U.S. PATENT DOCUMENTS

| | | | |
|---|---|---|---|
| 1,927,528 | 9/1933 | Nisson | 81/3.8 |
| 4,552,039 | 11/1985 | Fisher | 294/100 |
| 5,052,250 | 10/1991 | Clarke et al. | 294/100 |
| 5,199,756 | 4/1993 | Bartlett et al. | 294/99.2 |

*Primary Examiner*—David A. Scherbel
*Assistant Examiner*—Daniel G. Shanley

[57] ABSTRACT

The present optical fiber connector insertion and removal tool that functions to enable a craftsperson to operate SC-type optical fiber connectors in confined spaces. This tool is constructed to hold the SC-type optical fiber connector away from the craftsperson's hand to enable the craftsperson to perform connector connect/disconnect operations while keeping their hands outside of the optical fiber connector patch panel. In addition, a sliding wedge is movably attached to the base of the present optical connector insertion and removal tool to form an assembly that allows the craftsperson to easily tighten or loosen their grip on the SC-type optical fiber connector 110 by simply and ergonomically flexing the thumb of the hand holding the tool. The present optical fiber connector insertion and removal tool bit configuration combines notched and contoured sections with which to grasp the SC-type optical fiber connector 110. The notched section mates with the indented area in the SC-type optical fiber connector 110 grip while the contour section wraps around the flexible plastic boot of the optical fiber connector 110. Furthermore, the light weight two-part plastic construction of the present optical fiber connector insertion and removal tool minimizes the impact should the tool contact optical fiber terminations or accidentally be dropped in the optical fiber connector patch panel.

7 Claims, 6 Drawing Sheets

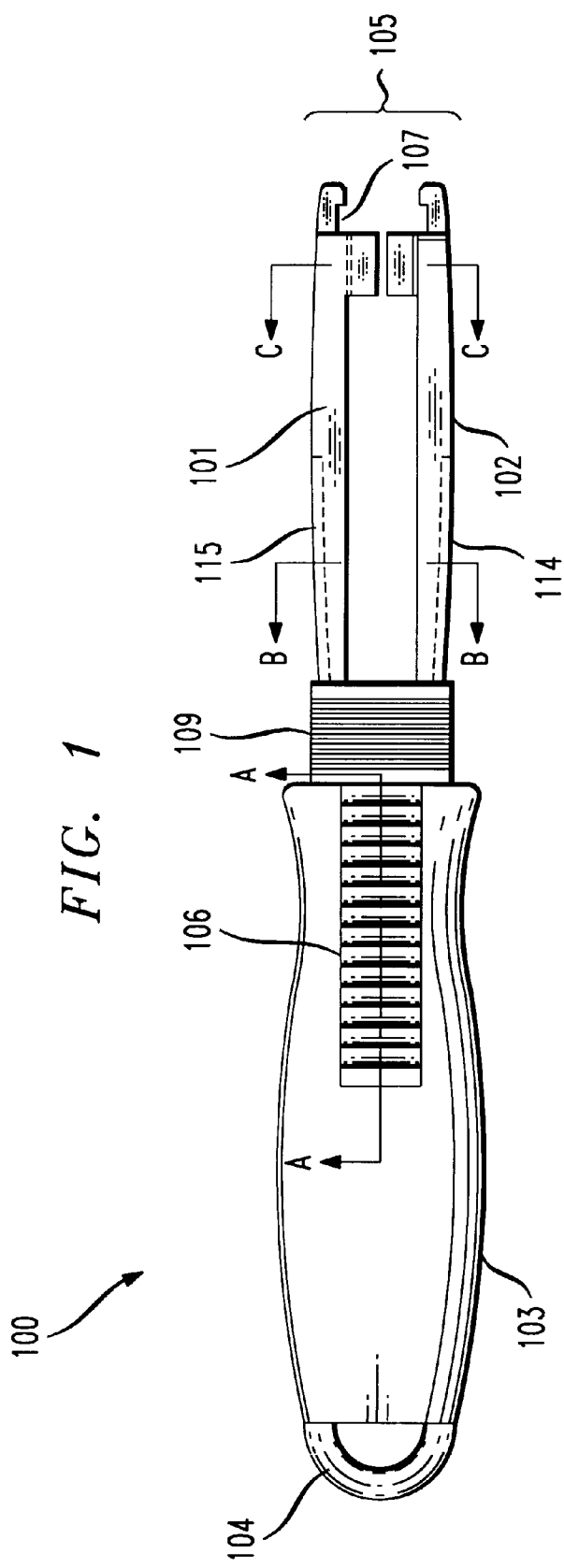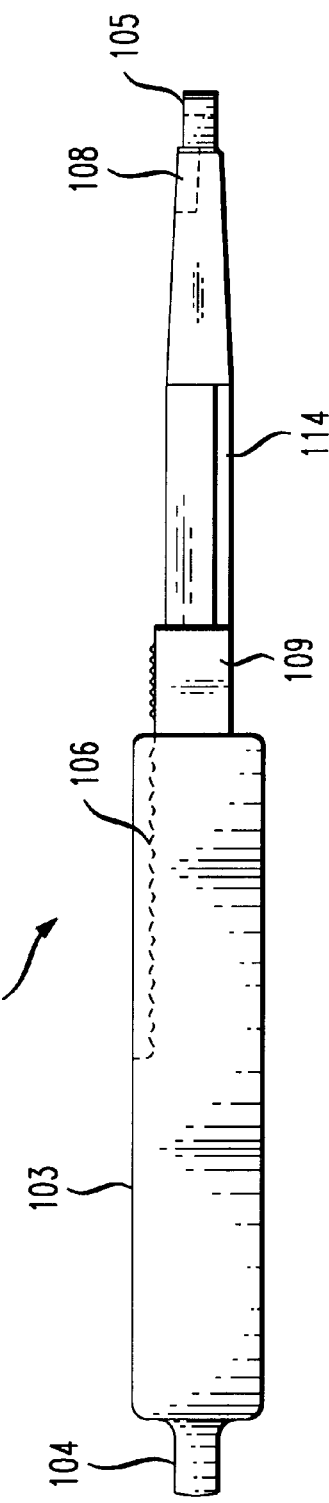

OPTICAL FIBER CONNECTOR INSERTION AND REMOVAL TOOL

FIELD OF THE INVENTION

This invention relates to optical fiber connectors and in particular to a tool that can be used by a craftsperson to install and remove SC-type Optical Fiber Connectors in a connector patch panel environment.

Problem

It is a problem in the field of optical fiber connectors to provide a connector patch panel that attains high connector density but also provides reasonable craftsperson access to insert and remove connectors in the patch panel. The craftsperson can either reach into the patch panel with their hand or preferably use a tool to activate the connector latch mechanism to insert and remove optical fiber connectors in the connector patch panel. The provision of an effective optical fiber connector insertion and removal tool is therefore determinative of the optical fiber connector density that can be realized in an optical fiber connector patch panel.

In the field of broadband communications, optical fibers are presently being used in the physical plant to provide a high capacity reliable communication medium. A difficulty with optical fibers is that they are small diameter elements and require high precision connectors to enable the reliable connection of the optical fiber to the optical fiber located in either another optical fiber or a termination element. Any mismatch in the alignment of the fiber-to-fiber physical contact results in changes in the index of refraction and unwanted signal reflections that disrupt the signals carried on this communication medium. The SC-type optical fiber connector is presently used to terminate the end of an optical fiber cable and uses a simple push-pull latch mechanism to secure the connector to the termination. The SC-type optical fiber connector stands up to the rugged use encountered in both inside plant and outside plant applications and are assembled so that the connector body is attached to the strength members that are located in the jumper cord of the optical fiber cable. This isolates the optical fiber and ferrule from the connector, thereby preventing momentary disconnects when loads are applied to the connector.

However, the SC-type optical fiber connector presently relies on manual hand activation of the latch mechanism by the craftsperson. This requirement of manual operation limits the types of optical fiber connector patch panels that can be used and increases the risk of optical fiber cable and/or optical fiber connector damage due to the insertion of the craftsperson's hand into the optical fiber patch panel. In high density communication medium applications, it is desirable to concentrate the optical fiber connectors in a small area, but this requires an optical fiber connector insertion and removal tool, which tool is presently absent from this field in the case of SC-type optical fiber connectors.

Solution

The above described problems are solved and a technical advance achieved in the field by the present optical fiber connector insertion and removal tool that functions to enable a craftsperson to operate SC-type optical fiber connectors in confined spaces. The present optical fiber connector insertion and removal tool is constructed to hold the SC-type optical fiber connector away from the craftsperson's hand to enable the craftsperson to perform connector connect/disconnect operations while keeping their hands outside of the optical fiber connector patch panel. In addition, a sliding wedge is movably attached to the base of the present optical connector insertion and removal tool to form an assembly that allows the craftsperson to easily tighten or loosen their grip on the SC-type optical fiber connector by simply and ergonomically flexing the thumb of the hand holding the tool. The present optical fiber connector insertion and removal tool bit configuration combines notched and contoured sections with which to grasp the SC-type optical fiber connector. The notched section mates with the indented area in the SC-type optical fiber connector grip while the contour section wraps around the flexible plastic boot of the optical fiber connector. Furthermore, the light weight two-part plastic construction of the present optical fiber connector insertion and removal tool minimizes the impact should the tool contact optical fiber terminations or accidentally be dropped in the optical fiber connector patch panel.

BRIEF DESCRIPTION OF THE DRAWING

FIG. 1 illustrates a top view of the present optical fiber connector insertion and removal tool;

FIG. 2 illustrates a side view of the present optical fiber connector insertion and removal tool;

DETAILED DESCRIPTION

Figure 3:
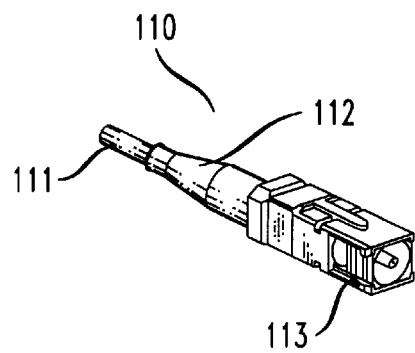
FIG. 3 illustrates a perspective view of a SC-type optical fiber connector connected to a length of optical fiber cable.

Passive optical connectors that are used in the physical plant must precisely mate the respective optical fibers to minimize signal reflection at the optical fiber junction. Most analog systems are very sensitive to intensity noise caused by laser interferometric phase-to-intensity modulation that are caused by reflective events in the fiber plant. Such noise factors can significantly degrade the overall system performance. FIG. 3 illustrates a perspective view of a SC-type optical fiber connector 110 that is connected to a length of optical fiber cable 111. The SC-type optical fiber connector 110 is presently used to terminate the end of an optical fiber cable 111 and uses a simple push-pull latch mechanism 113 to secure the connector 110 to the termination. The SC-type optical fiber connector 110 stands up to the rugged use encountered in both inside plant and outside plant applications and is assembled so that the connector body is attached to the strength members that are located in the jumper cord of the optical fiber cable 111. This isolates the optical fiber and ferrule from the connector 110, thereby preventing momentary disconnects when loads are applied to the connector 110.

The SC connector 110 offers improved insertion loss performance due to the following well known advantageous characteristics incorporated into this design:

Improved fiber concentricity

Improved ferrule tolerances

Improved fiber cladding outside diameter tolerances

Oriented "tuned" connector assembly

These innovations provide for in-service connections with an average insertion loss of approximately 0.12 dB with a standard deviation of approximately 0.08 dB. Thus, the SC-type optical fiber connector 110 is well suited for the physical plant environment in wideband communications.

The newer SC connector 110 designs that are specified for the broadband communication network use zirconia ferrules with a spherical end face geometry. This geometry is carefully controlled to maintain fiber-to-fiber physical contact. This physical contact interface minimizes changes in index of refraction, thus minimizing reflections. The present optimized polishing techniques use an ultra-fine silicon dioxide slurry in order to achieve reflectance values of better than −55 dB. Thus, it is important to maintain this intimate contact and avoid disturbing the existing terminations when installing or maintaining other optical fiber connectors 110 in the physical plant.

Optical Fiber Connector Patch Panel

Figure 4:
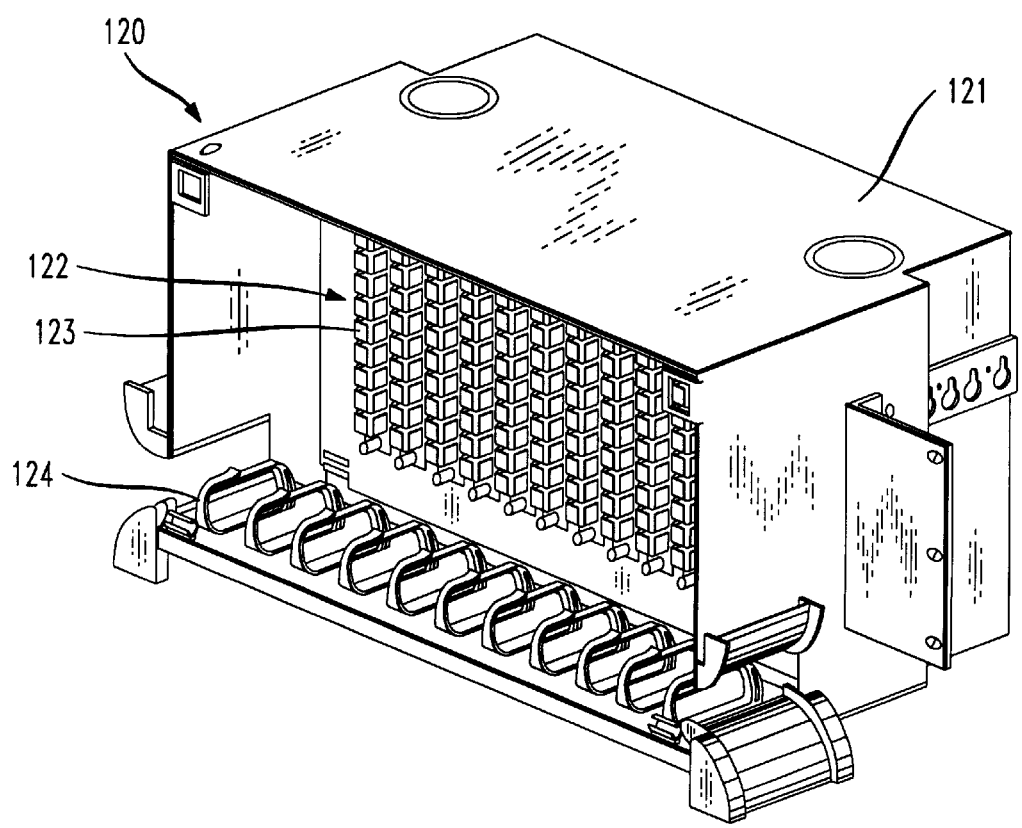
FIG. 4 illustrates a perspective view of a typical optical fiber connector patch panel.
Figure 5:
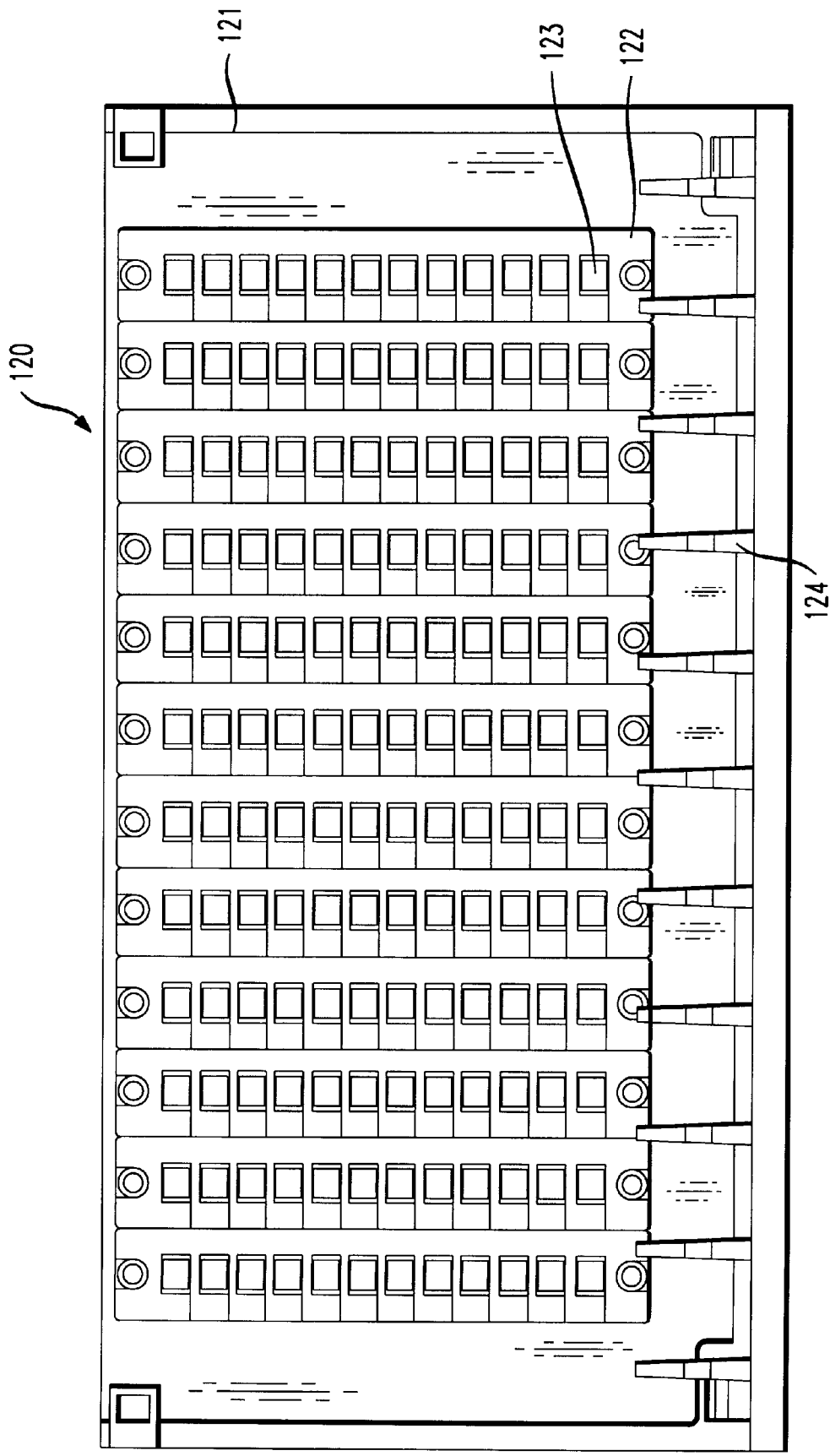
FIG. 5 illustrates a partial front view of the optical fiber connector patch panel of FIG. 4.
Figure 6:
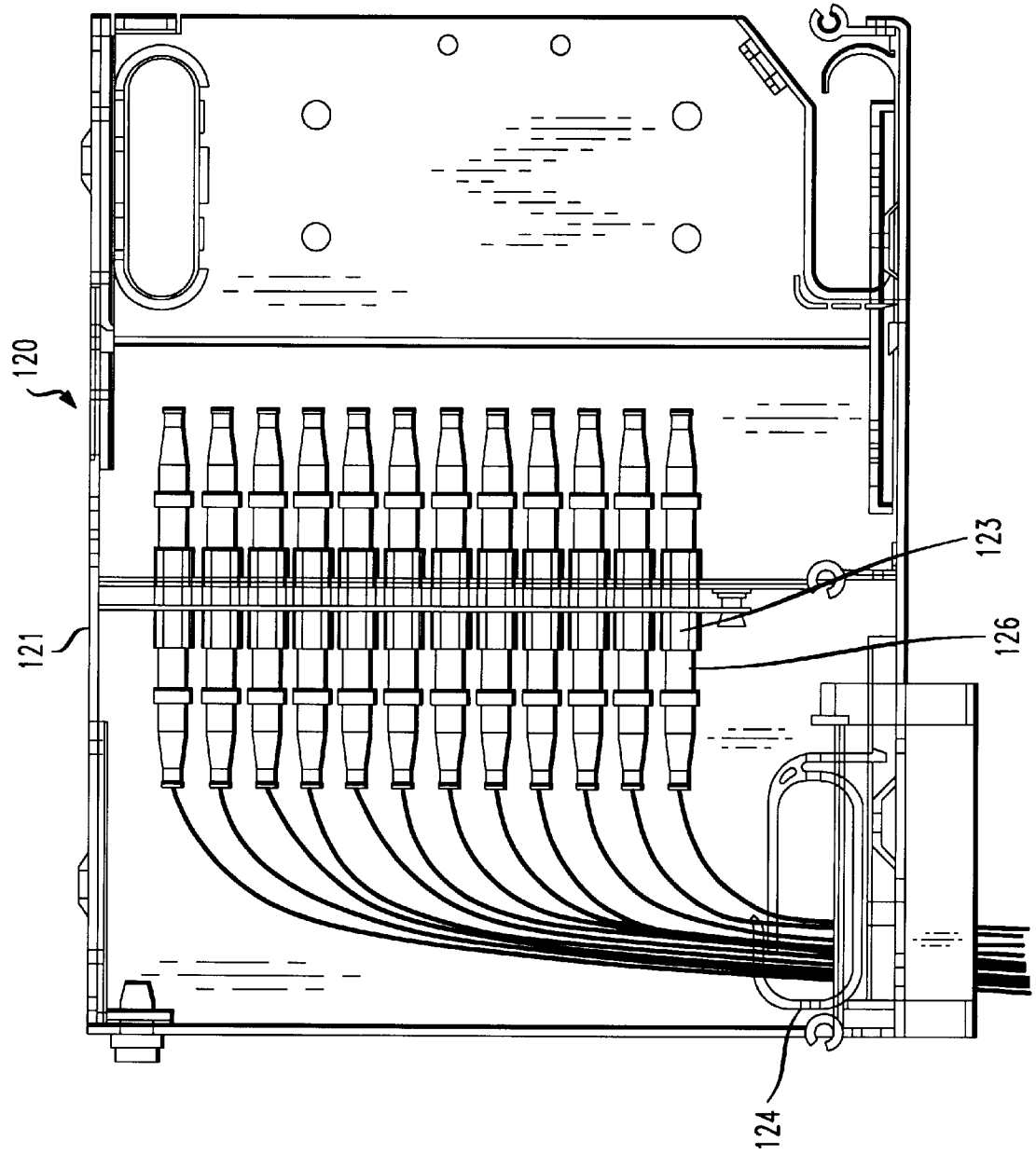
FIG. 6 illustrates a side cross-section view of the optical fiber connector patch panel of FIG. 4.

As an example of a typical physical plant environment, FIG. 4 illustrates a perspective view of a typical optical fiber connector patch panel 120 and FIGS. 5 and 6 illustrate a partial front view and a side cross-section view, respectively, of the optical fiber connector patch panel 120 of FIG. 3. The optical fiber connector patch panel 120 comprises a frame 121 into which is inserted a plurality of connector blocks 122, each of which receives a plurality of optical fiber connectors 123. Also included in the frame 121 is a number of optical fiber cable guides 124 that serve to retain the optical fibers in a predetermined orientation as they are threaded through the optical fiber cable guides 124 to a selected optical fiber connector 123 located in one of the optical fiber connector blocks 122. As can be seen from FIGS. 4–6, the optical fiber connectors 123 are placed in close proximity to each other, such that there is little room for the craftsperson to reach the latch mechanism 113 of the SC-type connectors 110 when they are inserted into their assigned connectors 123 in the connector patch panel 120. The density of the optical fiber connectors 123 in the connector patch panel 120 that can be realized, while still enabling the craftsperson to perform routine maintenance, is therefore a function of the craftsperson's ability to access the individual SC-type optical fiber connectors 110. The craftsperson's ability to operate the SC-type optical fiber connectors 110 is enhanced by the present optical fiber connector insertion and removal tool 100 that is used to manipulate the SC-type optical fiber connectors 110 within the connector parch panel 120.

Optical Fiber Connector Insertion and Removal Tool

Figure 7:
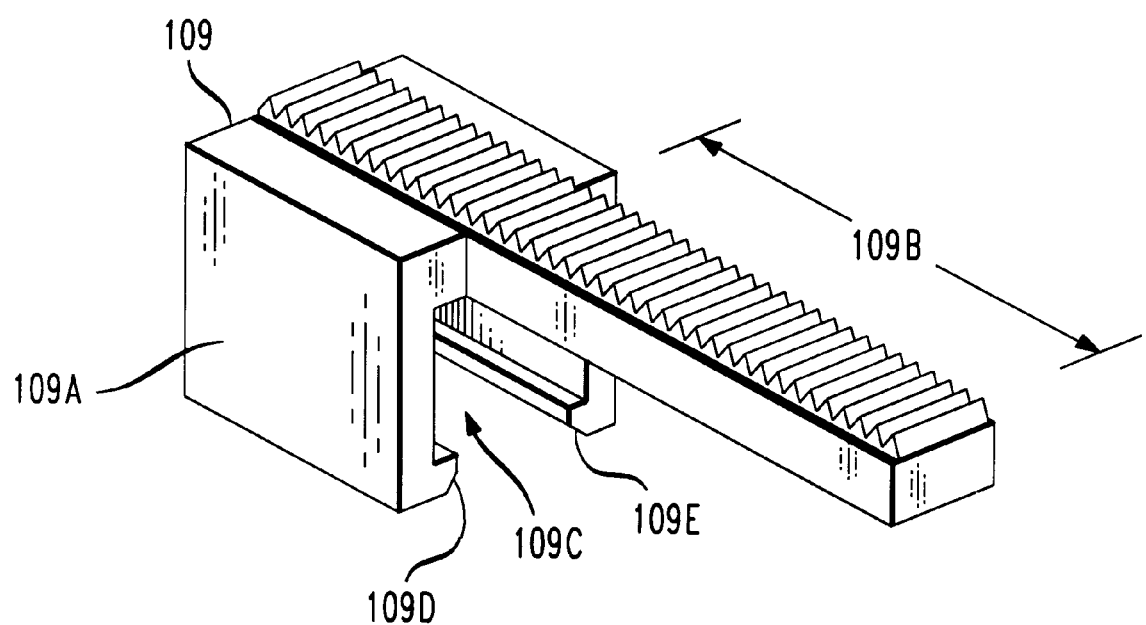
FIG. 7 illustrates a perspective view of the wedge slide mechanism.
Figure 8:
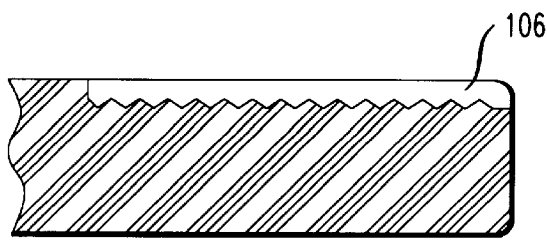
FIG. 8 illustrates cross-section view A—A of FIG. 1 to provide additional details of the grip of the present optical fiber connector insertion and removal tool.
Figure 9:
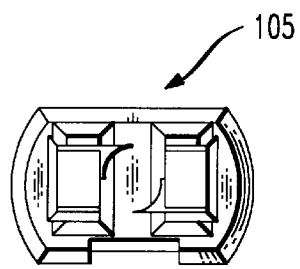
FIG. 9 illustrates a working end view of the present optical fiber connector insertion and removal tool.
Figure 10:
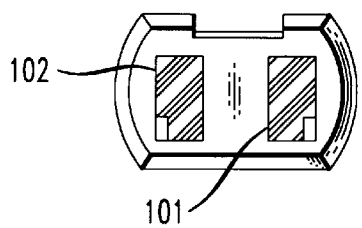
FIG. 10 illustrates cross-section view B—B of FIG. 1 to provide additional details of the connector gripping arms of the present optical fiber connector insertion and removal tool.
Figure 11:
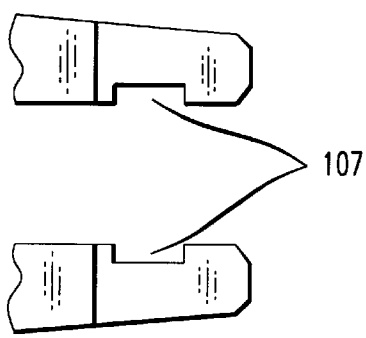
FIG. 11 illustrates additional details of the tip of the present optical fiber connector insertion and removal tool.

FIG. 1 illustrates a top view of the present optical fiber connector insertion and removal tool 100, FIG. 2 illustrates a side view of the present optical fiber connector insertion and removal tool 100, while FIG. 11 illustrates additional details of the tip 105 of the present optical fiber connector insertion and removal tool 100 and FIG. 7 illustrates a perspective view of the wedge slide mechanism 109. FIG. 8 illustrates cross-section view A—A of FIG. 1 to provide additional details of the grip mechanism 106 of the present optical fiber connector insertion and removal tool 100, FIG. 9 illustrates a tip end view of the present optical fiber connector insertion and removal tool 100, and FIG. 10 illustrates cross-section view B—B of FIG. 1 to provide additional details of the arms 101, 102 of the present optical fiber connector insertion and removal tool 100.

The present optical fiber connector insertion and removal tool 100 comprises a base or handle 103 element of shape and extent to match the contours of the craftsperson's hand. The basic geometry of the handle 103 is an elongated rectangular solid, with one end including a loop 104 formed thereon to enable the present optical fiber connector insertion and removal tool 100 to be secured to a loop or clip for convenience of carrying. The other, distal end of the handle 103 is attached to first and second parallel oriented arms 101, 102 that extend from the handle 103 and function to grasp a connector by means of a tip mechanism 105 consisting of two halves, each of which is affixed to an end of a corresponding one of said first and second arms 101, 102 distal from the handle 103. The length, size and shape of these two arms 101, 102 are selected to enable the present optical fiber connector insertion and removal tool 100 to fit within the confined space of the optical fiber patch panel 120 illustrated in FIGS. 4–6. The tip mechanism 105 is architected to engage the latch mechanism 113 located on the SC-type optical fiber connector and a wedge mechanism 109, that has a ribbed surface formed thereon for ease of operation, is slidably attached to the handle 103 and arms 101, 102 for controllably adjusting the magnitude of a force applied by the tip 105 on an SC-type optical fiber connector, that is positioned between the distal ends of the first and second arms 101, 102. The wedge slide mechanism 109 functions to regulate a distance between the first and second arms 101, 102. This is accomplished by wedge slide mechanism 109 that comprises a box-shaped body 109A that has an aperture 109C formed therein, The aperture 109C has an opening in one side thereof, bounded by lips 109D and 109E. The wedge slide mechanism 109 is snapped on to arms 101, 102 such that the lips 109D and 109E ride on the corresponding tracks 114, 115 formed in the arms 101, 102 respectively and the body 109A substantially encircles the arms 101, 102. The arms 101, 102 are tapered so that as the wedge slide mechanism 109 is moved toward the tip mechanism 105, the aperture 109C forces the arms 101, 102 together, thereby closing the two halves of the tip mechanism 105 on the SC-type connector that is located in the tip mechanism 105. The wedge slide mechanism 109 also includes an arm 109B that slides into a receiving recess formed in handle 103. Both the arm 109B and the body 109A of the wedge slide mechanism 109 can have a ribbed surface on a top side thereof to facilitate the operation of the wedge slide mechanism 109 by providing a high friction surface for the craftsperson's thumb.

Thus, the present optical fiber connector insertion and removal tool 100 can securely grip the SC-type connector in the tip mechanism 105 and also operate the latch mechanism 113 that is included therein. The tip mechanism 105 combines notched 107 and contoured 108 sections with which to grasp the SC-type optical fiber connector. The notched section 107 mates with the indented area in the SC-type connector while the contour section 108 wraps around the flexible plastic boot 112 of the connector. In addition, light weight two part plastic construction is combined with rounded edges to minimize the impact should the present optical fiber connector insertion and removal tool 100 accidentally bump against fiber terminations or accidentally be dropped in the optical fiber connector patch panel 120.

SUMMARY

As illustrated in these above-noted Figures, the present optical fiber connector insertion and removal tool 100 contains the following novel features:

1. The dual beam base construction provides structural rigidity to hold the optical fiber connector at a distance of approximately 6 inches away from the handle 103 to enable the craftsperson to perform connect/disconnect operations while keeping their hands outside of the patch panel 120.
2. A sliding wedge mechanism 109 is movably attached to the handle 103 to form an assembly that allows the craftsperson to easily tighten or loosen the grip of the present optical fiber connector insertion and removal tool 100 on the connector by simply and ergonomically flexing the thumb of the hand holding the tool.
3. A front end tip configuration combines notched 107 and contoured 108 sections with which to grasp the SC-type optical fiber connector. The notched section 107 mates with the indented area in the SC-type connector while the contour section 108 wraps around the flexible plastic boot 112 of the connector.
4. Light weight two part plastic construction is combined with rounded edges to minimize the impact should the present optical fiber connector insertion and removal tool 100 accidentally bump against fiber terminations or accidentally be dropped in the optical fiber connector patch panel 120.

What is claimed:

1. An optical fiber connector tool for use in insertion and removal of an SC-type optical fiber connector, comprising:

base means having a gripping surface to enable a user to securely hold said optical fiber connector tool;

first and second parallel oriented arms extending from one end of said base means for grasping said SC-type optical fiber connector, said first and second arms each being tapered and having formed therein a track along an edge thereof;

tip means affixed to an end of said first and second arms distal from said base means having first and second features formed therein for engaging corresponding features formed in a latch mechanism that is located on said SC-type optical fiber connector that is placed in said tip mechanism to release said latch mechanism; and wedge means slidably attached to said tapered surface of said first and second parallel oriented arms for controllably adjusting the magnitude of a force applied by said first and said second features of said tip means to said SC-type optical fiber connector by regulating a distance between said first and second arms, comprising:

a box-shaped body that has an aperture formed therein through which said first and said second arms extend, said aperture having an opening in one side thereof, bounded by first and second lips which are formed in said box-shaped body to ride on said tracks formed in said first and second arms, wherein said first and said second arms are tapered so that as said box-shaped body is moved toward said tip means, said aperture forces said first and said second arms together, thereby engaging said first and said second features of said tip mechanism on said corresponding features formed in said latch mechanism of said SC-type optical fiber connector that is located in said tip mechanism.

2. The optical fiber connector tool of claim 1 wherein said first and second arms are of length to hold said SC-type optical fiber connector away from said base means to enable a craftsperson to perform connect/disconnect operations while keeping their hands outside of a patch panel in which said SC-type optical fiber connector in mounted.

3. The optical fiber connector tool of claim 1 wherein said first and second arms are of length approximately 6 inches from said base means to said tip means.

4. The optical fiber connector tool of claim 1 wherein said wedge means is operable by a user flexing the thumb of the hand holding said optical fiber connector tool to slide said wedge means along said tapered surface of said first and second arms in a direction parallel to their long dimension.

5. The optical fiber connector tool of claim 1 wherein said tip means comprises:

notched and contoured sections with which to grasp said SC-type optical fiber connector.

6. The optical fiber connector tool of claim 5 wherein said notched section mates with an indented area formed in said SC-type optical fiber connector.

7. The optical fiber connector tool of claim 5 wherein said contoured section wraps around a flexible plastic boot mounted on said SC-type optical fiber connector.

* * * * *